US012764456B2

(12) United States Patent
Chen et al.

(10) Patent No.: US 12,764,456 B2
(45) Date of Patent: Oct. 13, 2026

(54) ELECTRONIC DEVICE

(71) Applicant: AAC Microtech (Changzhou) Co., Ltd., Changzhou City (CN)

(72) Inventors: Weimin Chen, Changzhou (CN); Yao Hui, Changzhou (CN)

(73) Assignee: AAC Microtech (Changzhou) Co., Ltd., Changzhou City (CN)

( * ) Notice: Subject to any disclaimer, the term of this patent is extended or adjusted under 35 U.S.C. 154(b) by 127 days.

(21) Appl. No.: 19/001,357

(22) Filed: Dec. 24, 2024

(65) Prior Publication Data

US 2026/0032377 A1 Jan. 29, 2026

Related U.S. Application Data

(63) Continuation of application No. PCT/CN2024/107207, filed on Jul. 24, 2024.

(51) Int. Cl.

| | |
|---|---|
| ***H04R 1/28*** | (2006.01) |
| ***H04M 1/03*** | (2006.01) |
| ***H04R 1/02*** | (2006.01) |
| ***H04R 7/04*** | (2006.01) |
| ***H04R 7/18*** | (2006.01) |
| ***H04R 9/02*** | (2006.01) |
| ***H04R 9/06*** | (2006.01) |

(52) U.S. Cl.

CPC ............. *H04R 1/288* (2013.01); *H04R 1/025* (2013.01); *H04R 1/028* (2013.01); *H04R 7/04* (2013.01); *H04R 7/18* (2013.01); *H04R 9/025* (2013.01); *H04R 9/06* (2013.01); *H04M 1/035* (2013.01); *H04R 2400/11* (2013.01); *H04R 2499/11* (2013.01)

(58) Field of Classification Search

CPC ... H04R 1/28; H04R 1/02; H04R 7/04; H04R 7/18; H04R 9/02; H04R 9/06; H04R 2400/11; H04R 2499/11; H04R 1/2873; H04M 1/03

See application file for complete search history.

(56) References Cited

U.S. PATENT DOCUMENTS

2020/0045434 A1* 2/2020 Zhou ........................ H04R 9/06
2020/0186930 A1* 6/2020 Xiao ........................ H04R 7/12
2020/0186933 A1* 6/2020 Hu ........................ H04R 15/00

* cited by examiner

*Primary Examiner* — Yosef K Laekemariam
(74) *Attorney, Agent, or Firm* — Wiersch Law Group

(57) ABSTRACT

An electronic device includes a casing, a first sound-emitting device and a second sound-emitting device. The first sound-emitting device includes a basket, a vibration system and a magnetic circuit system. The vibration system includes a diaphragm and a voice coil. The magnetic circuit system includes a magnetic bowl, a magnetic unit and an auxiliary magnetic. The first sound-emitting device further includes an upper shell and a front cavity. The first sound-emitting device further includes a first elastic damping member. The diaphragm, the magnetic bowl, the basket and the first elastic damping member are sealed and enclosed to form a first rear cavity, and the first sound-emitting device, the second sound-emitting device and the casing are enclosed to form a second rear cavity. The sound-emitting device of the present invention with good vibration damping effect, high frequency response sensitivity and better acoustic performance.

11 Claims, 14 Drawing Sheets

A-A

ELECTRONIC DEVICE

CROSS-REFERENCE TO RELATED APPLICATIONS

This application is a continuation of International Application No. PCT/CN2024/107207, filed on Jul. 24, 2024, the entire content of which is incorporated herein by reference.

TECHNICAL FIELD

The present invention relates to the technical field of electroacoustic conversion, in particular to an electronic device.

BACKGROUND

With the rapid development of technology, electronic devices (such as tablet computers and smart phones) are increasingly favored by users due to their characteristics of being thin, light, and easy to carry. Users can use electronic devices to listen to music, watch videos, and so on. Currently, most portable electronic devices have a sound-emitting device, and the sound-emitting device is generally arranged on the side or the back of the portable electronic device. The sound-emitting device is mainly used to convert electrical signals into sound signals.

The sound-emitting device of the electronic device related to the relevant technology includes a basket, a vibration system fixed to the basket, and a magnetic circuit system with a magnetic gap. The vibration system includes a diaphragm fixed to the basket for vibrating and emitting sound, and a voice coil inserted into the magnetic gap to drive the diaphragm to vibrate, so as to improve the acoustic performance of the sound-emitting device.

However, in the electronic devices of the related technologies, in order to achieve a balance between the performance and the space of the sound-emitting device, it is often designed to have one regular sound-emitting device plus a two-in-one component. The two-in-one component is a single sound-emitting device body, with either an open-cavity or a closed-cavity design, fulfilling both the functions of sound emission and receiver. When the two-in-one component adopts an open-cavity design, the internal space of the terminal device serves as the rear cavity of the two-in-one single body. When it is used for sound emission, near the modal frequency of the mobile phone or when the excitation voltage is relatively high, the internal pressure of the terminal device becomes relatively large, resulting in a serious casing vibration phenomenon.

Therefore, it is necessary to provide a new electronic device to solve the above-mentioned problems.

SUMMARY

The technical problem to be solved by the present invention is to provide an electronic device with good vibration damping effect, high frequency response sensitivity, and better acoustic performance.

In order to solve the above technical problem, the present invention provides an electronic device.

An electronic device includes a casing, a first sound-emitting device and a second sound-emitting device. The first sound-emitting device and the second sound-emitting device are accommodated in the casing, fixed to the casing and spaced apart from each other. The first sound-emitting device includes a basket, a vibration system fixed to the basket and a magnetic circuit system driving the vibration system to vibrate. The vibration system includes a diaphragm fixed to the basket and a voice coil driving the diaphragm to vibrate for emitting sound. The magnetic circuit system includes a magnetic bowl fixed to the basket, a magnetic unit fixed to one side of the magnetic bowl adjacent to the vibration system and an auxiliary magnetic spaced apart from the magnetic unit, and a magnetic gap is formed between the magnetic unit and the auxiliary magnetic. The voice coil is inserted into the magnetic gap. The first sound-emitting device further includes an upper shell fixed to one side of the basket adjacent to the vibration system, and a front cavity for sound output formed by the upper shell and the diaphragm enclosing each other. The first sound-emitting device further includes a first elastic damping member, the first elastic damping member is connected to the magnetic bowl and the basket for supporting vibration of the magnetic circuit system, the diaphragm, the magnetic bowl, the basket and the first elastic damping member are sealed and enclosed to form a first rear cavity, and the first sound-emitting device, the second sound-emitting device and the casing are enclosed to form a second rear cavity.

Preferably, the first elastic damping member includes a ring-shaped first fixing portion fixed to one side of the basket away from the vibration system, an elastic portion formed by bending and extending from one side of the first fixing portion adjacent to the magnetic unit and a second fixing portion formed by extending from one side of the elastic portion adjacent to the magnetic unit, and the second fixing portion is fixed to an outer periphery of the magnetic bowl.

Preferably, a cross-section of the elastic portion along a vibration direction of the vibration system is of an S-shaped, W-shaped or C-shaped structure.

Preferably, the first elastic damping member is made of a single-element damping material, a polymeric damping material, or a metal composite damping structural material.

Preferably, the first sound-emitting device further includes a mass block fixed to one side of the magnetic bowl away from the vibration system.

Preferably, the magnetic unit is provided with a through hole formed to penetrate along the vibration direction of the vibration system. The first sound-emitting device further includes a non-magnetic connecting member fixed to one side of the diaphragm adjacent to the magnetic circuit system and a magnet assembly fixed to one side of the non-magnetic connecting member adjacent to the magnetic circuit system, and the non-magnetic connecting member and the magnet assembly are suspended inside the through hole respectively.

Preferably, the first sound-emitting device further includes a soft-iron assembly with a hollow structure positioned inside the through hole and fixed to the magnetic bowl, and the magnet assembly is suspended in the hollow structure and spaced apart from the soft-iron assembly.

Preferably, the soft-iron assembly includes a first soft-iron layer fixed to one side of the magnetic bowl adjacent to the vibration system, a first plastic layer laminated and fixed on the first soft-iron layer, and a second soft-iron layer laminated and fixed on the first plastic layer.

Preferably, the soft-iron assembly further includes a second plastic layer, and the second plastic layer is fixed between the first soft-iron layer and the magnetic bowl.

Preferably, the electronic device further includes a second elastic damping member, and the first sound-emitting device is elastically supported on the casing through the second elastic damping member.

Preferably, the electronic device further includes a third elastic damping member, one side of the third elastic damping member adjacent to the vibration system is fixed to the diaphragm, and the third elastic damping member connects to the basket and the auxiliary magnetic.

Compared with the related art, in the electronic device of the present invention, the first sound-emitting device and the second sound-emitting device are fixed to the casing and spaced apart from each other. Among them, the first sound-emitting device further includes an upper shell fixed on the side of the basket adjacent to the vibration system. The upper shell and the diaphragm are arranged to enclose the front cavity for sound output. The first sound-emitting device further includes the first elastic damping member. The first clastic damping member is connected to the magnetic bowl and the basket for supporting vibration of the magnetic circuit system. The diaphragm, the magnetic bowl, the basket and the first elastic damping member are hermetically arranged to enclose and form the first rear cavity. The first sound-emitting device, the second sound-emitting device and the casing are enclosed to form a second rear cavity. The vibrations of the magnetic circuit system and the vibration system jointly form two suspension systems. Subject to the interaction forces with opposite directions, the force exerted on a speaker when it is connected to a terminal device is reduced, achieving a certain vibration-damping effect and thus avoiding the problem of casing vibration. In addition, when the first sound-emitting device and the second sound-emitting device are emitting sound, inside the electronic device, the first sound-emitting device and the second sound-emitting device are out of phase in terms of the internal pressure of the mobile phone. This can significantly reduce the pressure inside the cavity of the electronic device within the frequency band where casing vibration is more pronounced, further achieving the effect of reducing casing vibration. Meanwhile, the above structural arrangement of the first sound-emitting device can increase the low-frequency sensitivity of the second sound-emitting device, further enhancing the acoustic performance of the sound-emitting devices.

BRIEF DESCRIPTION OF THE DRAWINGS

In order to explain the technical solutions of the embodiments of the present invention more clearly, the following will briefly introduce the accompanying drawings used in the embodiments. Apparently, the drawings in the following description are only some embodiments of the present invention. Those of ordinary skill in the art can obtain other drawings based on these drawings without creative work.

DETAILED DESCRIPTION OF THE EMBODIMENTS

Figure 1:
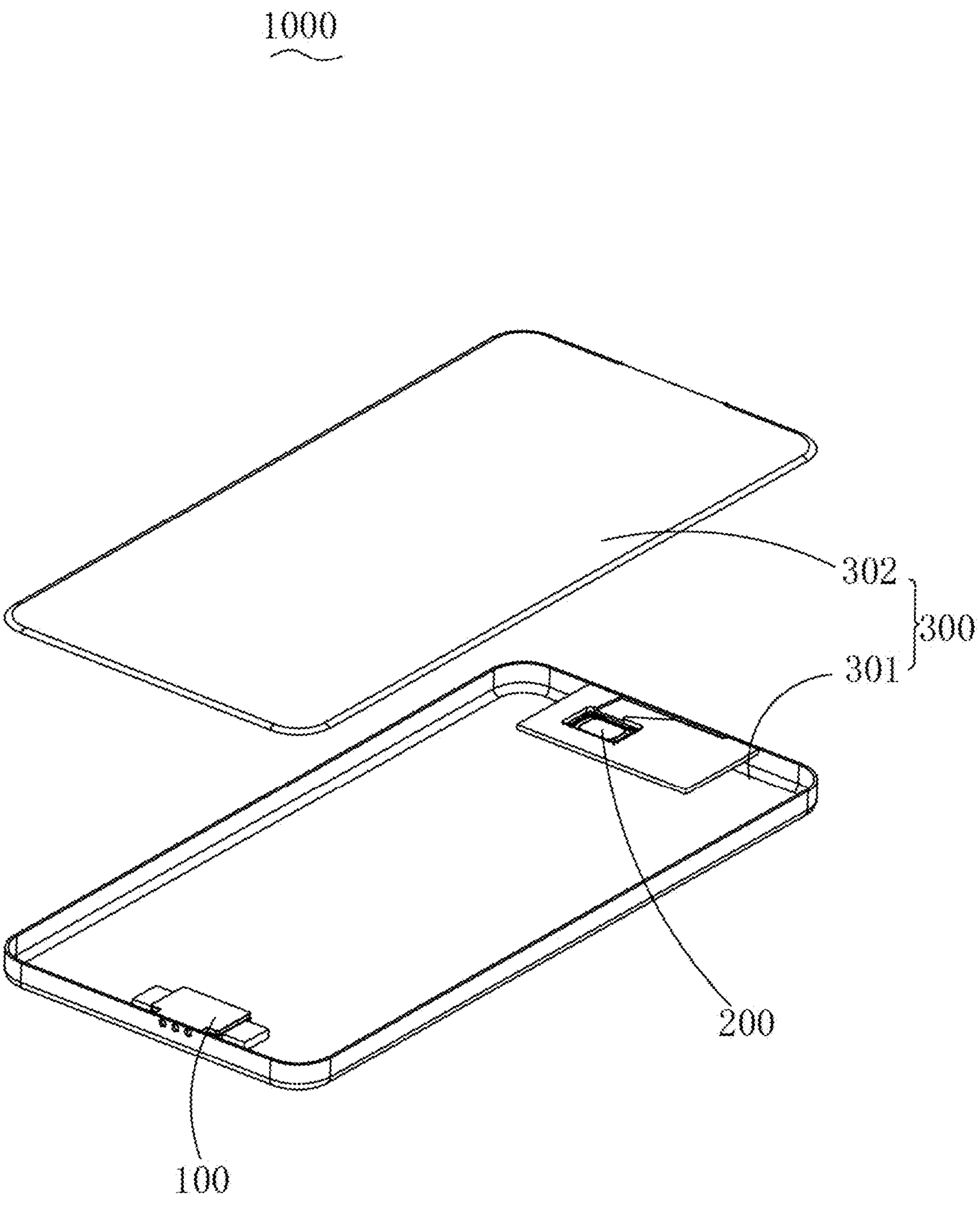
FIG. 1 is a schematic diagram of an overall exploded structure of an electronic device according to a first embodiment of the present invention.
Figure 2:
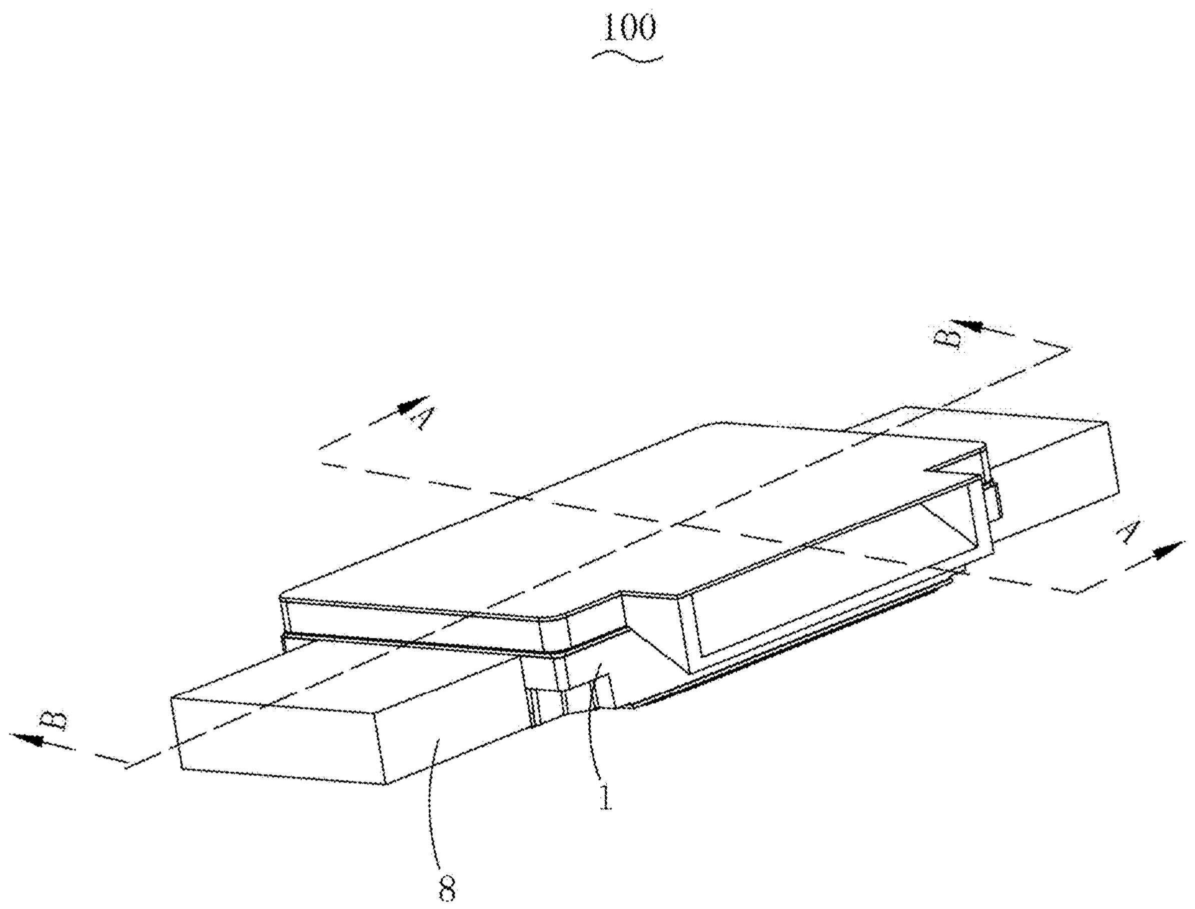
FIG. 2 is a schematic diagram of a structure of a first sound-emitting device according to the first embodiment of the present invention.
Figure 3:
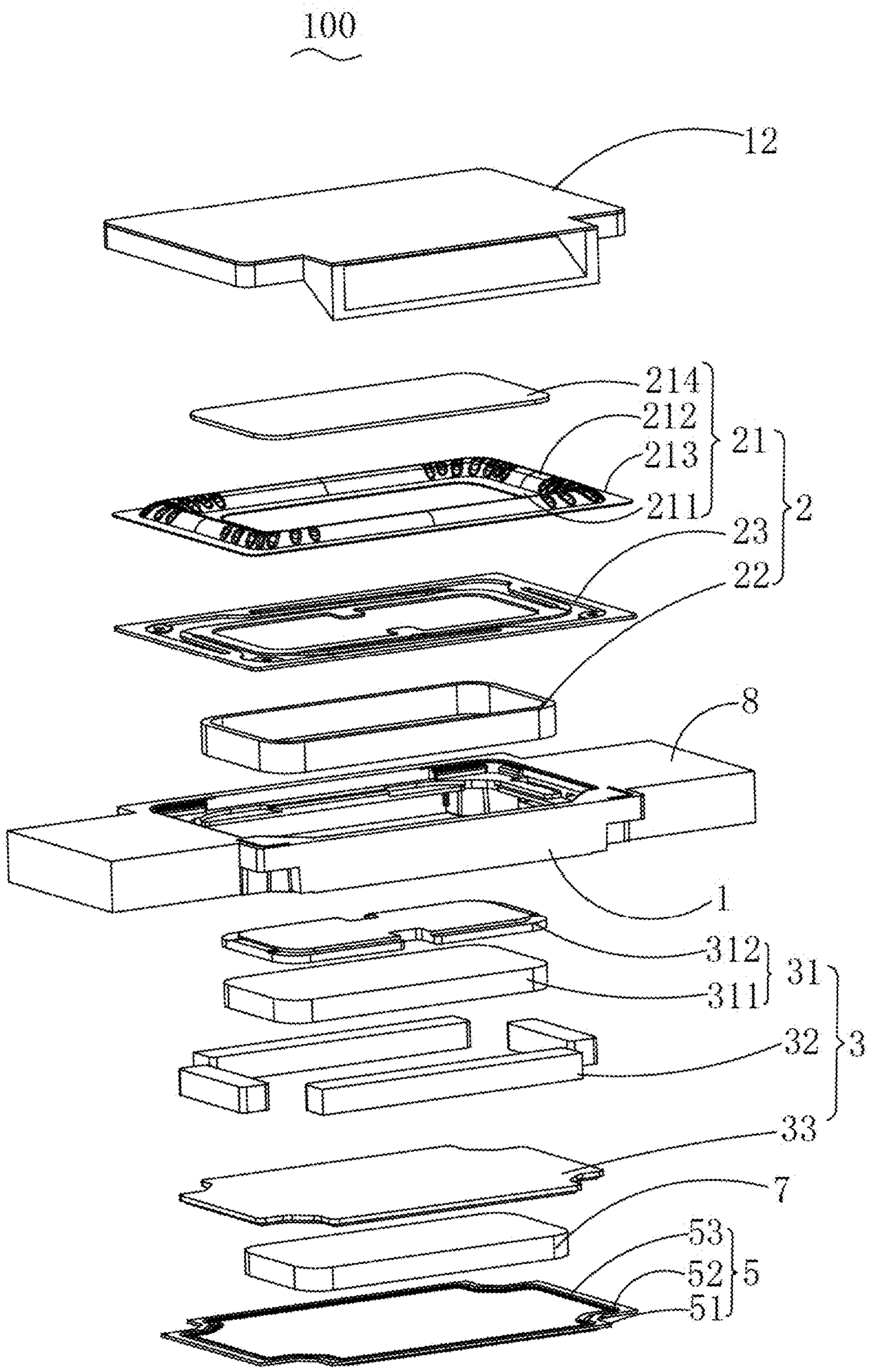
FIG. 3 is a schematic diagram of an exploded structure of FIG. 2.
Figure 4:
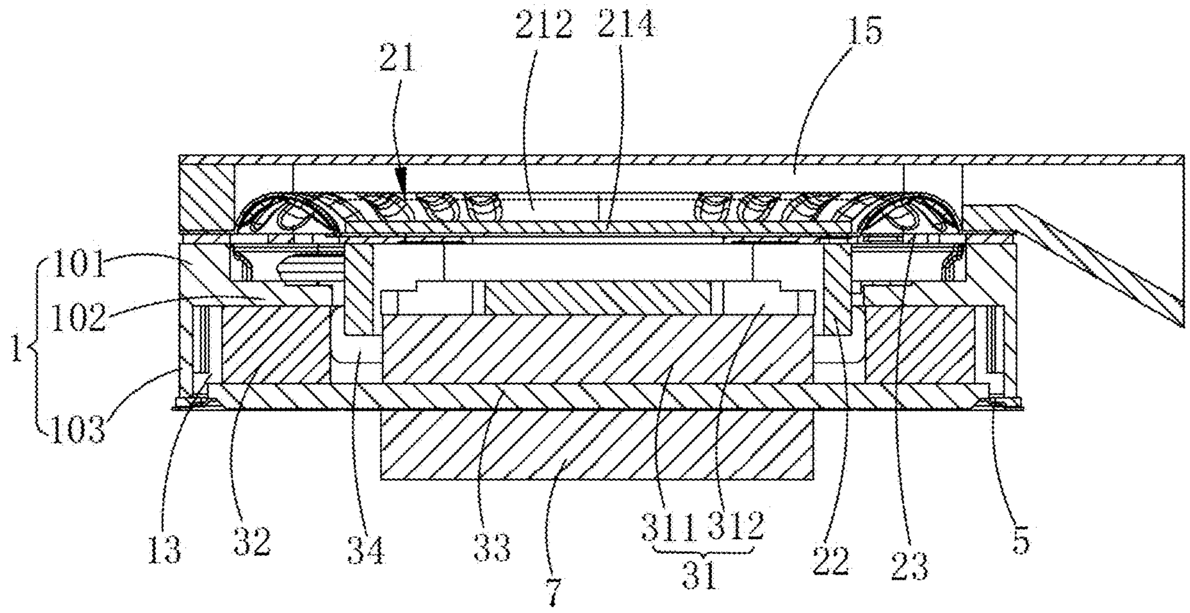
FIG. 4 is a cross-sectional view cut along A-A line of FIG. 2.
Figure 5:
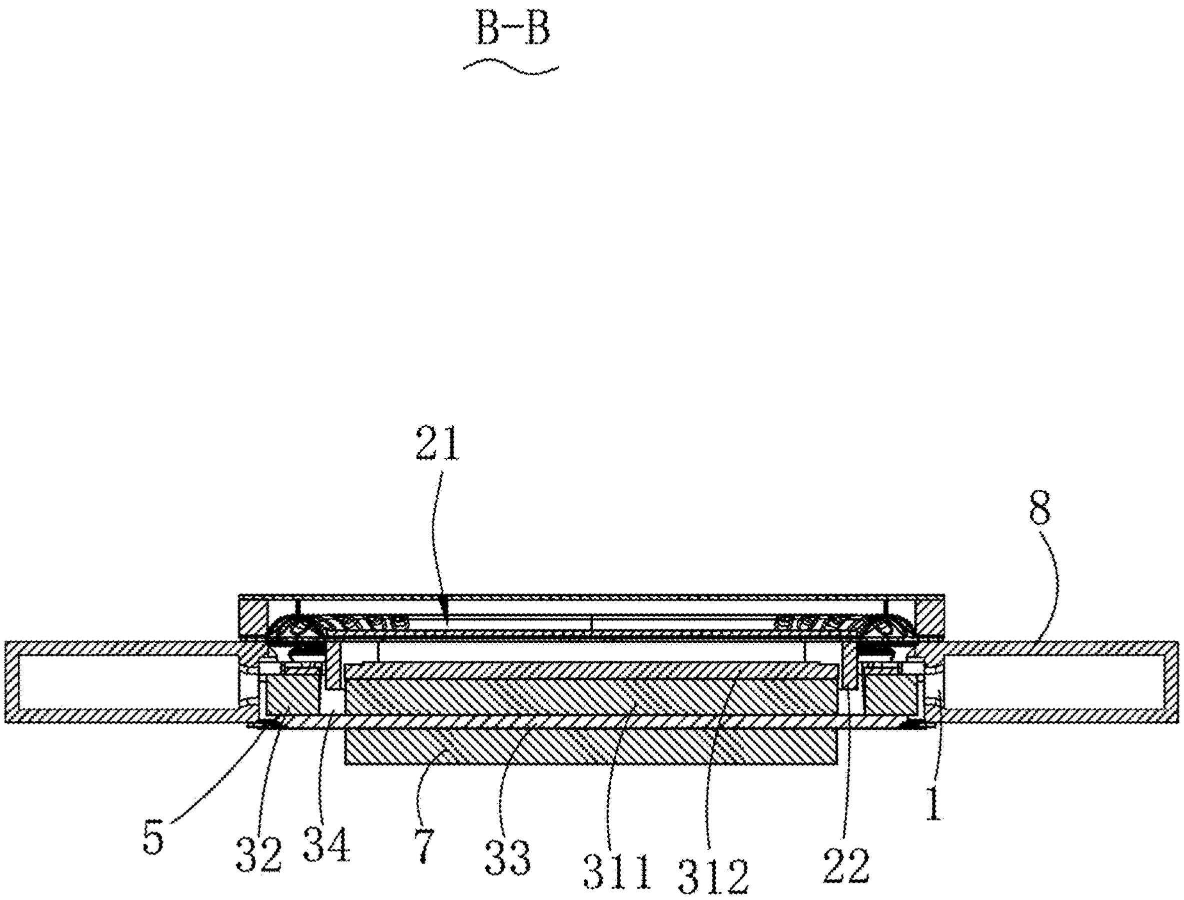
FIG. 5 is a cross-sectional view cut along B-B line of FIG. 2.
Figure 6:
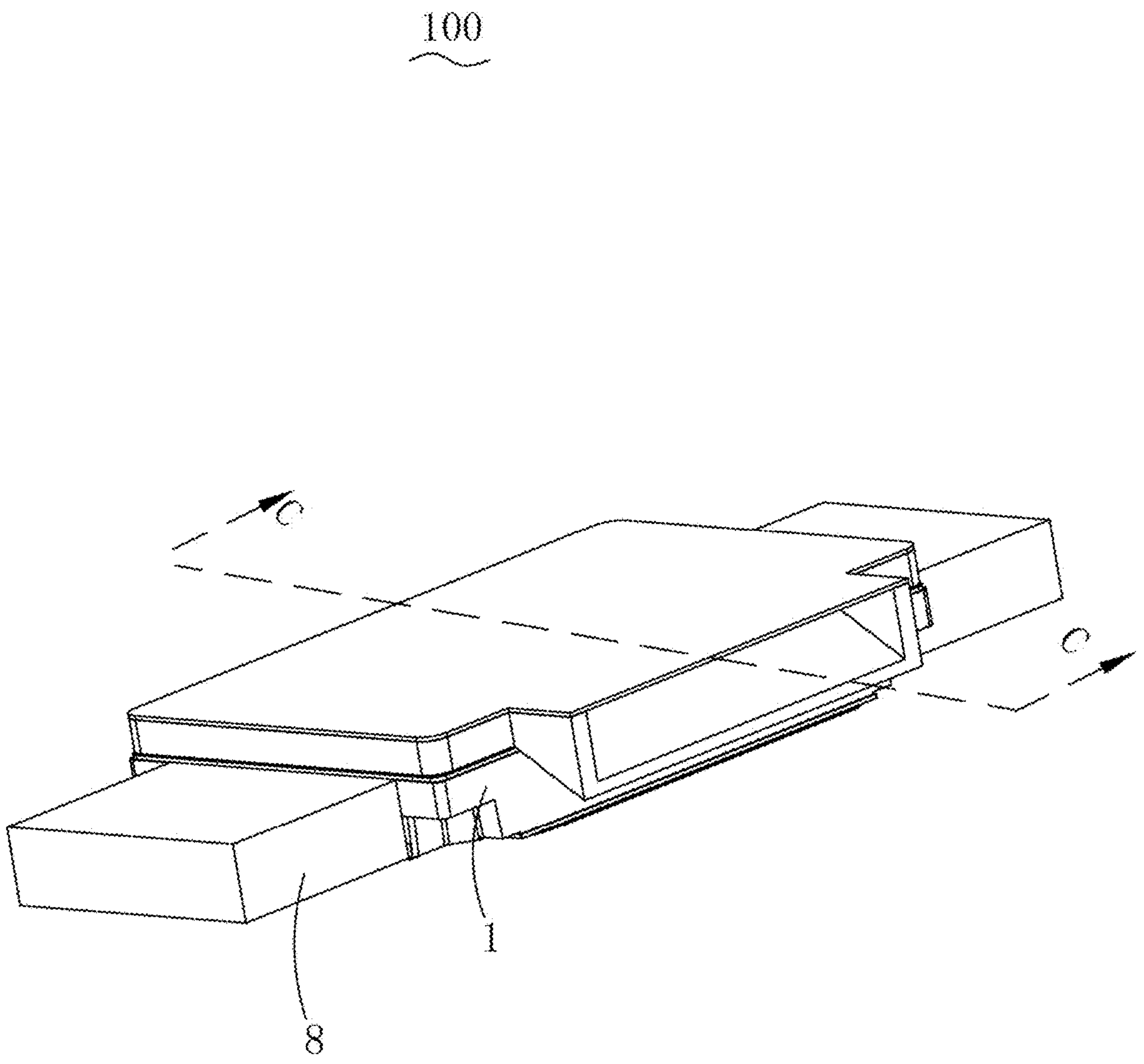
FIG. 6 is a schematic diagram of a 3D structure of the first sound-emitting device according to a second embodiment of the present invention.
Figure 7:
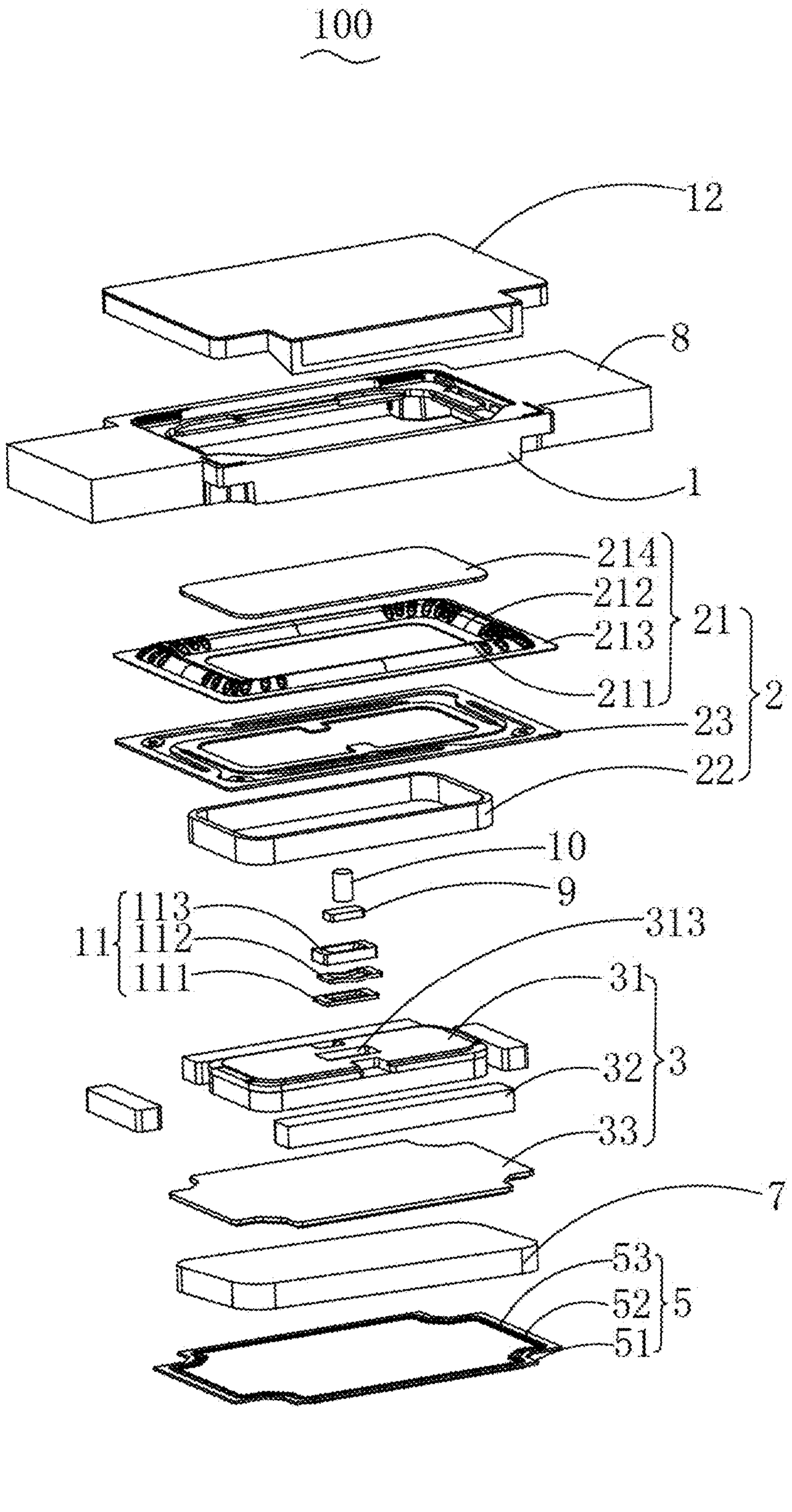
FIG. 7 is a schematic diagram of an overall exploded structure of the first sound-emitting device according to a second embodiment of the present invention.
Figure 8:
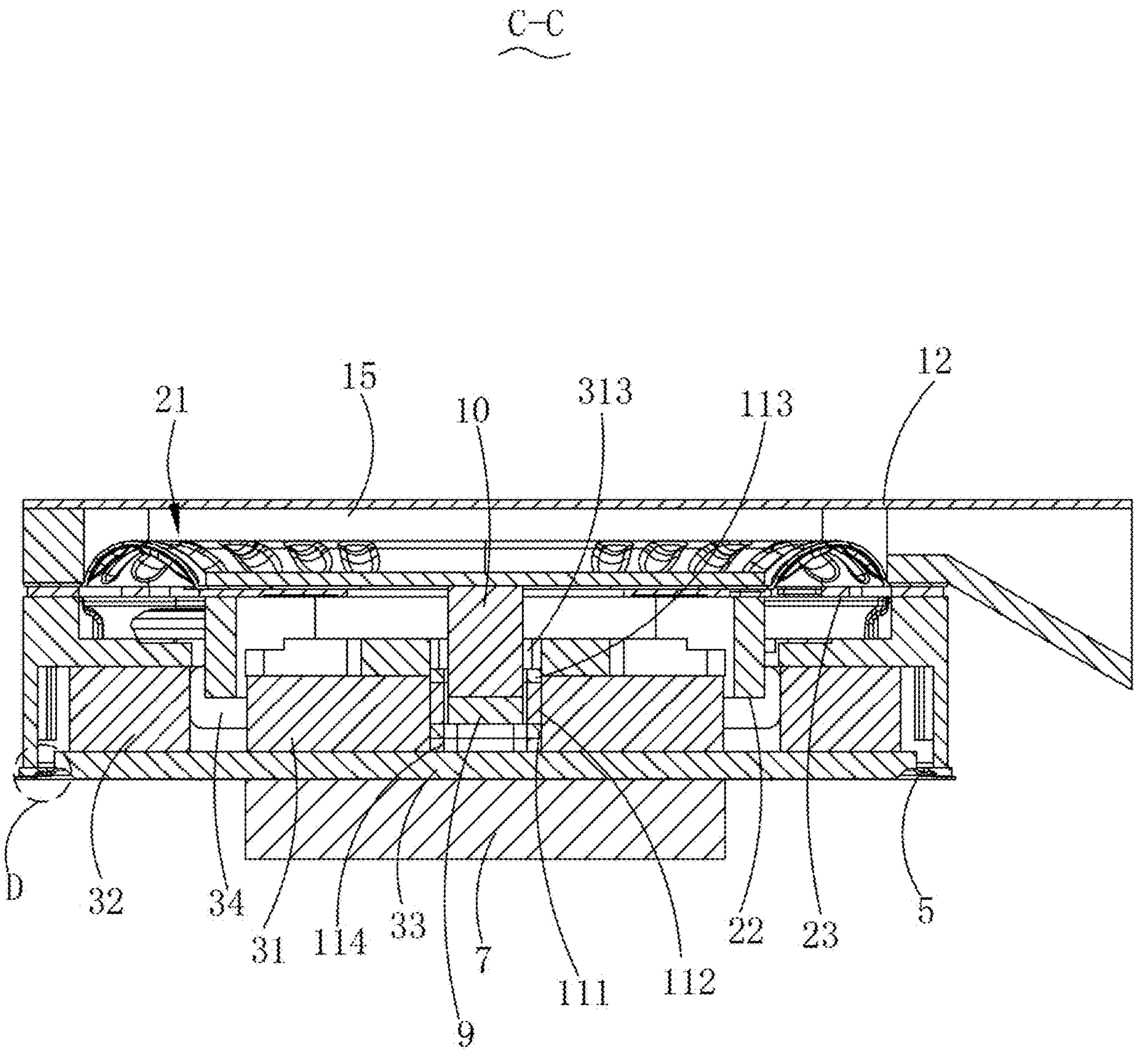
FIG. 8 is a cross-sectional view cut along C-C line of FIG. 6.

The technical solutions in the embodiments of the present invention will be clearly and completely described below in conjunction with the accompanying drawings in the embodiments of the present invention. Apparently, the described embodiments are only a part of the embodiments of the present invention, rather than all the embodiments. Based on the embodiments in the present invention, all other embodiments obtained by those ordinarily skilled in the art without doing creative work shall fall within the protection scope of the present invention.

In a first embodiment, referring to FIGS. 1-12, an electronic device 1000 is provided, the electronic device 1000 includes a casing 300, a first sound-emitting device 100 and a second sound-emitting device 200 which are accommodated in the casing 300, fixed to the casing 300 and spaced apart from each other.

Furthermore, the casing 300 includes a bottom shell 301 and an upper cover 302 which is fixedly covered on the bottom shell 301. The second sound-emitting device 200 is fixed on the bottom shell 301, and the first sound-emitting device 100 is fixed on the bottom shell 301 and spaced apart from the second sound-emitting device 200.

The first sound-emitting device 100 includes a basket 1, a vibration system 2 fixed to the basket 1 and a magnetic circuit system 3 driving the vibration system 2 to vibrate.

Specifically, the basket 1 is configured to support and fix the vibration system 2 and the magnetic circuit system 3.

The vibration system 2 includes a diaphragm 21 fixed to the basket 1 and a voice coil 22 driving the diaphragm 21 to vibrate for emitting sound.

In this embodiment, the diaphragm 21 includes a ring-shaped vibrating portion 211, a folding ring portion 212 which is formed by extending from an outer periphery of the vibrating portion 211 towards one side adjacent to the basket 1, a second fixing portion 213 which is formed by extending from an outer periphery of the folding ring portion 212 towards a direction adjacent to the basket 1, and a dome 214 which is fixedly covered on the vibrating portion 211. One side of the second fixing portion 213 adjacent to the basket 1 is fixed to the basket 1, and the voice coil 22 is fixed to one side of the vibrating portion 211 adjacent to the magnetic circuit system 3.

Furthermore, the vibration system 2 further includes a framework 23, an outer periphery of the framework 23 is fixed to the basket 1, one side of the framework 23 adjacent to the vibration system 2 is fixed to the vibrating portion 211, and the voice coil 22 is fixed to one side of the framework 23 away from the vibration system 2. Optionally, the framework 23 can also be a PFC circuit board, and the framework 23 is electrically connected to the voice coil 22.

In this embodiment, the magnetic circuit system 3 includes a magnetic bowl 33 fixed to the basket 1, a magnetic unit 31 fixed to one side of the magnetic bowl 33 adjacent to the vibration system 2 and an auxiliary magnetic 32 spaced apart from the magnetic unit 31, and a magnetic gap 34 is formed between the magnetic unit 31 and the auxiliary magnetic 32; the voice coil 22 is inserted into the magnetic gap 34.

Specifically, the magnetic unit 31 includes a main magnetic 311 which is stacked and fixed on the magnetic bowl 33 and a pole core 312 which is stacked and fixed on one side of the main magnetic 311 adjacent to the vibration system 2, and the auxiliary magnetic 32 is arranged to surround the main magnetic 311 at intervals, thus forming the magnetic gap 34.

The first sound-emitting device 100 further includes an upper shell 12 fixed to one side of the basket 1 adjacent to the vibration system 2, and a front cavity 15 for sound output formed by the upper shell 12 and the diaphragm 21 enclosing each other.

The first sound-emitting device 100 further includes a first elastic damping member 5, the first elastic damping member 5 is connected to the magnetic bowl 33 and the basket 1 for supporting vibration of the magnetic circuit system 3, the diaphragm 21, the magnetic bowl 33, the basket 1 and the first clastic damping member 5 are sealed and enclosed to form a first rear cavity 13; and the first sound-emitting device 100, the second sound-emitting device 200 and the casing 300 are enclosed to form a second rear cavity 14. Among them, one side of the first elastic damping member 5 adjacent to the magnetic circuit system 3 is fixed to an outer periphery of the magnetic bowl 33, one side of the first clastic damping member 5 away from the magnetic circuit system 3 is fixed to an inner periphery of the basket 1, so as to elastically connect the magnetic circuit system 3 to the basket 1.

Specifically, the upper shell 12 and the diaphragm 21 are enclosed to form the front cavity 15 for sound output. The diaphragm 21, the magnetic bowl 33, the basket 1 and the first elastic damping member 5 are sealed and enclosed to form the first rear cavity 13; and the first sound-emitting device 100, the second sound-emitting device 200 and the casing 300 are enclosed to form the second rear cavity 14. The vibrations of the magnetic circuit system and the vibration system jointly form two suspension systems. Subject to the interaction forces with opposite directions, the force exerted on a speaker when it is connected to a terminal device is reduced, achieving a certain vibration-damping effect and thus avoiding the problem of casing vibration. In addition, when the first sound-emitting device and the second sound-emitting device are emitting sound, inside the electronic device, the first sound-emitting device and the second sound-emitting device are out of phase in terms of the internal pressure of the mobile phone. This can significantly reduce the pressure inside the cavity of the electronic device within the frequency band where casing vibration is more pronounced, further achieving the effect of reducing casing vibration. Meanwhile, the above structural arrangement of the first sound-emitting device can increase the low-frequency sensitivity of the second sound-emitting device, further enhancing the acoustic performance of the sound-emitting devices.

In this embodiment, each of opposite sides of the basket 1 is further extended to form an extending wall 8 with a cavity structure, one side of the extending walls 8 adjacent to the magnetic circuit system 3 is respectively fixed to the first elastic damping member 5. The volume of the rear cavity of the first sound-emitting device 100 is enlarged through the extended wall 8, which is conducive to improving the acoustic performance of the sound-emitting devices.

In this embodiment, the first elastic damping member 5 includes a ring-shaped first fixing portion 51 fixed to one side of the basket 1 away from the vibration system 2, an elastic portion 52 formed by bending and extending from one side of the first fixing portion 51 adjacent to the magnetic unit 31 and a second fixing portion 53 formed by extending from one side of the elastic portion 52 adjacent to the magnetic unit 31, and the second fixing portion 53 is fixed to an outer periphery of the magnetic bowl 33. The first fixing portion 51 is installed and fixed on the basket 1. Then, the second fixing portion 53 is fixed to the magnetic bowl 33 by the elastic portion 52, thus enabling the elastic portion 52 to elastically support the magnetic circuit system 3 and achieve the vibration-damping effect.

In this embodiment, a cross-section of the elastic portion 52 along a vibration direction of the vibration system 2 is of an S-shaped structure. The S-shaped structure has good elastic properties. Alternatively, the cross-section of the elastic portion 52 can be W-shaped or C-shaped, which can be selected according to specific requirements.

In this embodiment, the first elastic damping member 5 is made of a single-element damping material, a polymeric damping material, or a metal composite damping structural material.

Specifically, the single-element damping material can be damping rubber, foamed sponge, etc.; the polymeric damping material can be composite materials such as those with particle doping, fiber doping and laminated plates; the metal composite damping structure can be high-damping metals, constrained layer damping structures, etc.

In this embodiment, the basket 1 includes a ring-shaped basket body 101, a connecting portion 102 formed by extending from an inner periphery of the basket body 101 and an installation portion 103 formed by extending from one side of the basket body 101 adjacent to the magnetic circuit system 3. The connecting portion 102 is stacked on one side of the auxiliary magnetic 32 adjacent to the vibration system 2, and the first elastic damping member 5 is fixed to one side of the installation portion 103 away from the vibration system 2.

In an optional embodiment of the present invention, the first sound-emitting device 100 further includes a mass block 7 fixed to one side of the magnetic bowl 33 away from the vibration system 2. By adjusting the mass of the mass block 7, as well as the stiffness and damping of the first elastic damping member 5, and by arranging the corresponding resonant frequency and damping of the magnetic circuit suspension system, so as to achieve the optimal vibration isolation effect at the selected casing vibration modal frequency. Optionally, the extending wall 8 and the magnetic bowl 33 can be hermetically connected by the first elastic damping member 5. The shape of the first elastic damping member 5 and its connection position with the basket can be adjusted to achieve the adjustment of the radiation area inside the cavity. The mass block 7 can be added to the bottom of the magnetic bowl 33 as needed to adjust the mass of the magnetic circuit suspension system.

By hermetically connecting the magnetic bowl 33 and the cavity structure with the first elastic damping member 5, another vibration system composed of the magnet unit 31, the magnetic bowl 33 and the first elastic damping member 5 is thus formed. This vibration system and the vibration system composed of the diaphragm 21, the dome 214 and the voice coil 22 are subjected to mutual forces and vibrate in opposite directions. Due to the mutual forces acting on the two vibration systems, the force exerted on the mobile phone casing, which is finally fixedly connected to the module is reduced, thus achieving a certain vibration damping effect. When the two sound-emitting components of the mobile phone emit sound simultaneously, the vibration modes caused by the structure of the mobile phone itself and the shape of its internal cavity will be generated, and there will be a stronger casing vibration phenomenon under the frequency of this mode. In the cavity of the mobile phone, the pressure of the magnetic circuit suspension system is out of phase with that of the receiver position in the mobile phone cavity. The total pressure inside the cavity is the difference between the two pressures. The internal pressure of the mobile phone can be reduced through the settings of the first sound-emitting device 100 and the second sound-emitting device 200 of the electronic device 1000. Meanwhile, by adjusting the mass, stiffness, and damping parameters of the magnetic circuit suspension system in the vibration-damping loudspeaker module, the resonant frequency and Q value of the magnetic circuit suspension system are adjusted. The resonant frequency is tuned to be consistent with the casing vibration modal frequency of the mobile phone that is desired to be suppressed, so as to achieve the optimal vibration-damping effect.

In this embodiment, the pressure curves inside the mobile phone (indicating the degree of casing vibration) and the two-in-one SPL curves (indicating the sound-emitting performance) under the two conditions of the conventional structure and the first vibration-damping structure are obtained through simulation based on the design principles. In the figure, the debugging parameters are set to achieve the optimal vibration damping effect near the specified frequency of 200 Hz. Corresponding adjustments can be made according to the actual casing vibration modal frequency of the mobile phone. It can be seen that after adopting the first vibration-damping structure, the internal pressure of the mobile phone is reduced, that is, the casing vibration is decreased. Meanwhile, the two-in-one low-frequency sensitivity is increased to a certain extent.

In a second embodiment, the structure of the second embodiment is basically the same as the first embodiment, and the technical effects produced are also basically the same. The differences are as follows.

Referring to FIGS. 1-8, on the basis of the second embodiment, the magnetic unit 31 is provided with a through hole 313 formed to penetrate along the vibration direction of the vibration system 2; the first sound-emitting device 100 further includes a non-magnetic connecting member 10 fixed to one side of the diaphragm 21 adjacent to the magnetic circuit system 3 and a magnet assembly 9 fixed to one side of the non-magnetic connecting member 10 adjacent to the magnetic circuit system 3, and the non-magnetic connecting member 10 and the magnet assembly 9 are suspended inside the through hole respectively 313.

Furthermore, by hollowing out the center of the magnetic unit 31, the fixed connection between the magnet assembly 9 and the non-magnetic connecting member 10 and the dome 214 made of non-magnetic materials is strengthened. By adjusting the shape of the magnet assembly 9 to match the nonlinear stiffness of the cavity, the distortion can be further reduced. When the diaphragm 21 is at the initial position, the resultant force exerted by the newly added magnet assembly 9 and an electromagnetic assembly on the vibration area is zero. During the vibration process of the diaphragm 21, the forces exerted by the magnet assembly 9 and the magnetic unit 31 on the vibration area are in the same direction as the vibration displacement of the vibration area. That is to say, they provide negative stiffness for the loudspeaker module, thereby reducing the system stiffness of the loudspeaker module, enhancing the low-frequency response sensitivity, and compensating for the low-frequency response loss caused by the magnetic circuit suspension system. During the vibration process of the diaphragm 21, the forces exerted by the magnet assembly 9 and the magnetic unit 31 on the vibration area are in the same direction as the vibration displacement of the vibration area. As a result, the amplitude of the magnetic circuit suspension system increases, and the pressure exerted by the magnetic circuit suspension system on the internal space of the mobile phone also rises. When the two sound-emitting units of the mobile phone work simultaneously, the total pressure in the internal space of the mobile phone can be further reduced, and the casing vibration can be further decreased. Since the magnetic circuit suspension system of the vibration-damping electronic device 1000 is equivalent to the function of the rear cavity secondary membrane of the second sound-emitting device 200 (two-in-one device), and its amplitude increases, the low-frequency sensitivity of the two-in-one device will be further enhanced. This enables the second embodiment to further improve the low-frequency response of the module and the receiver and reduce the distortion of the module based on the advantages of the first embodiment.

In this embodiment, the first sound-emitting device 100 further includes a soft-iron assembly 11 with a hollow structure positioned inside the through hole 313 and fixed to the magnetic bowl 33, and the magnet assembly 9 is suspended in the hollow structure and spaced apart from the soft-iron assembly 11. Through the soft-iron assembly 11, a negative stiffness that varies with the amplitude can be generated, thereby achieving a nonlinear match with the stiffness of the cavity and reducing distortion.

Specifically, When the diaphragm 21 is at the initial position, the resultant force exerted by the newly added magnet assembly 9 and the magnetic unit 31 on the vibration area is zero. During the vibration process of the diaphragm 21, the forces exerted by the magnet assembly 9 and the magnetic unit 31 on the vibration area are in the same direction as the vibration displacement of the vibration area. Under the same excitation voltage, the vibration area can have a larger amplitude. For the voice coil 22 suspension system, it can enhance the low-frequency response sensitivity and compensate for the low-frequency response loss caused by the magnetic circuit suspension. For the magnetic circuit suspension system, the amplitude of the magnetic circuit suspension also increases correspondingly. When the two sound-emitting units of the mobile phone work simultaneously, the pressure in the internal space of the mobile phone can be further reduced, and the casing vibration can be further decreased.

Figure 9:
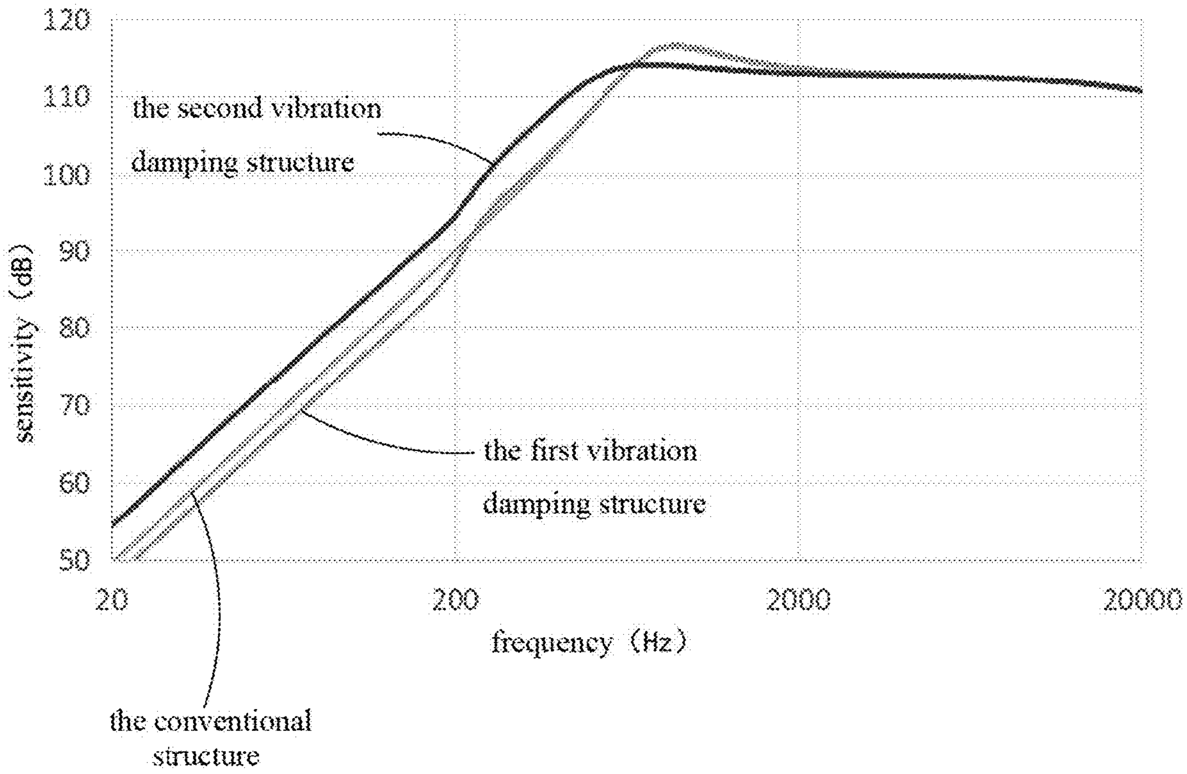
FIG. 9 is a first curve graph of a sensitivity SPL for the present invention and a conventional structure.
Figure 10:
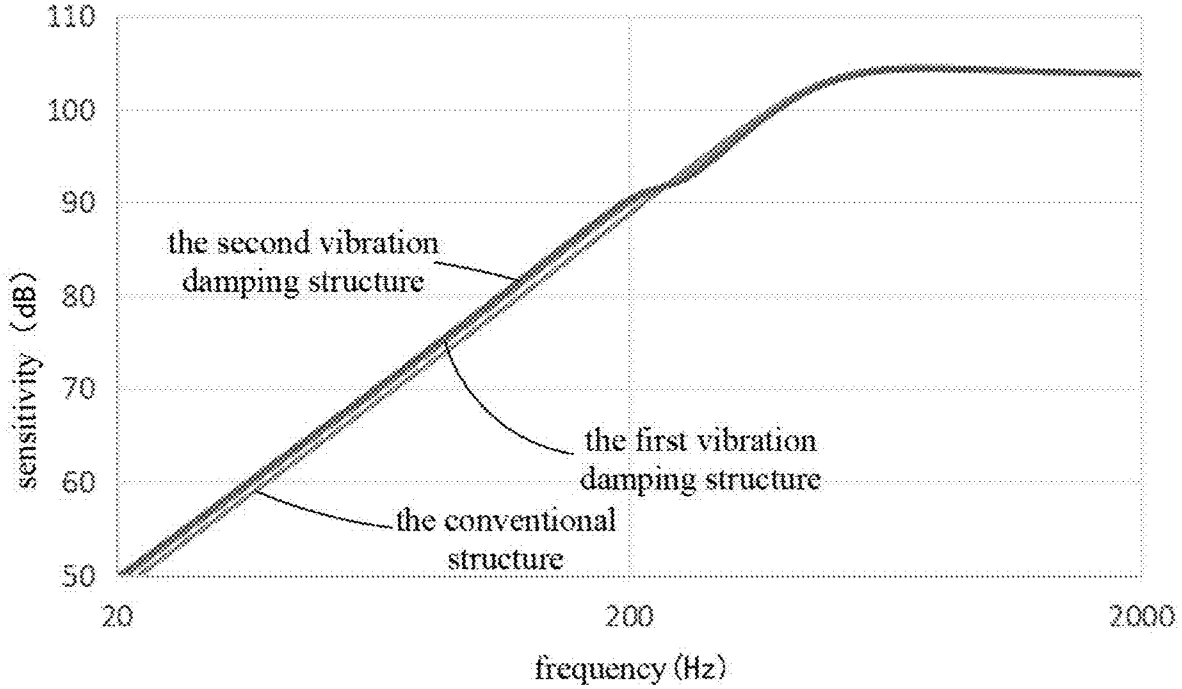
FIG. 10 is a second curve graph of the sensitivity SPL for the present invention and the conventional structure.
Figure 11:
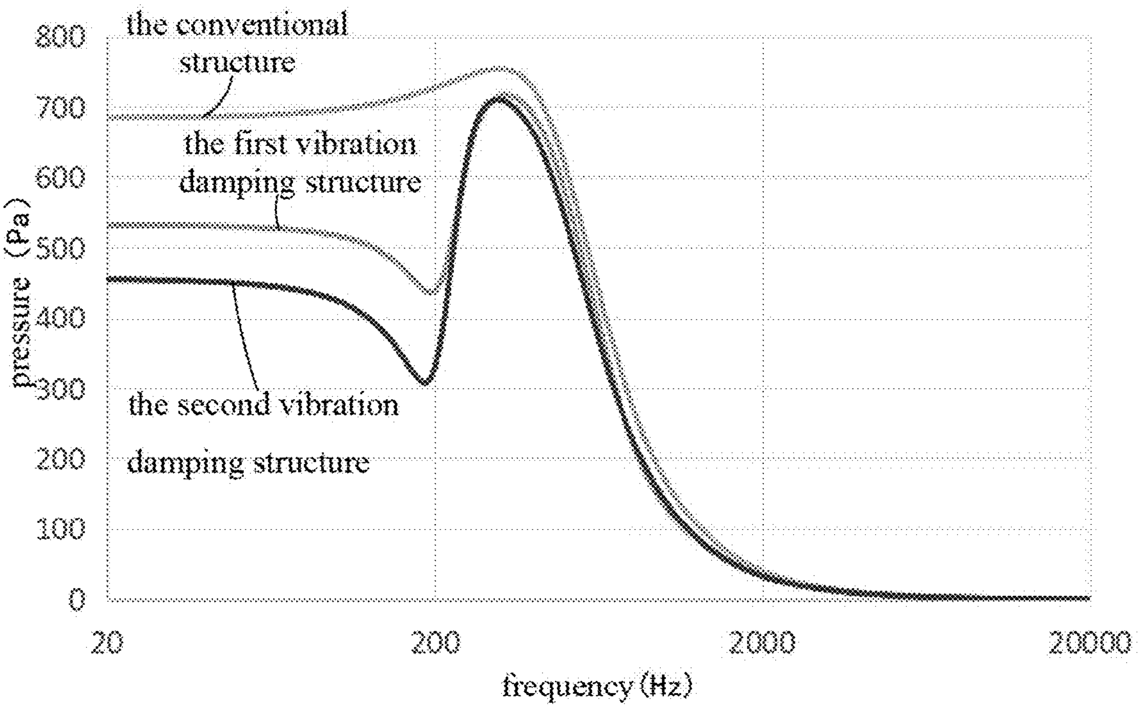
FIG. 11 is an internal pressure curve graph of the present invention and the conventional structure applied to a mobile phone.
Figure 12:
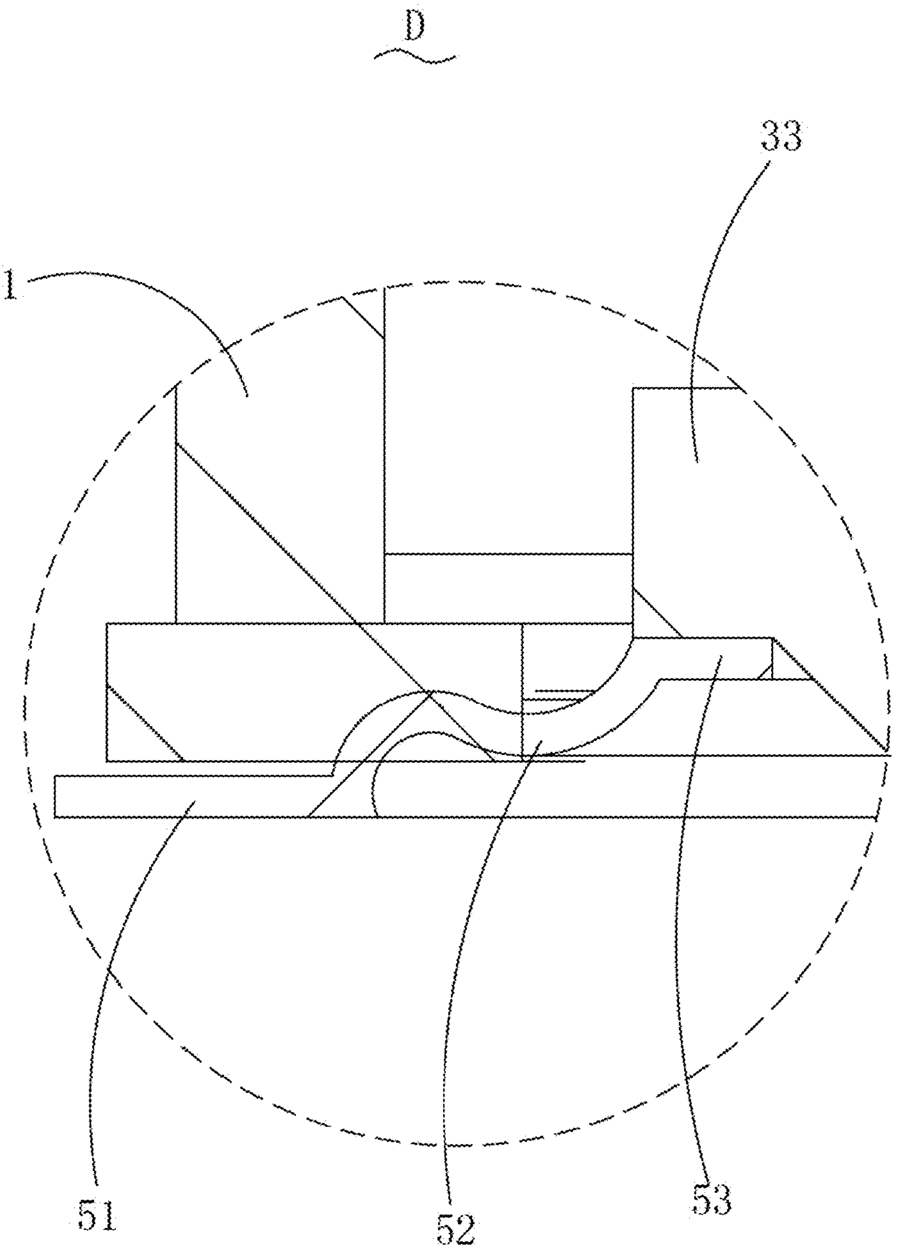
FIG. 12 is a partial enlarged diagram of an area D of FIG. 8.
Figure 13:
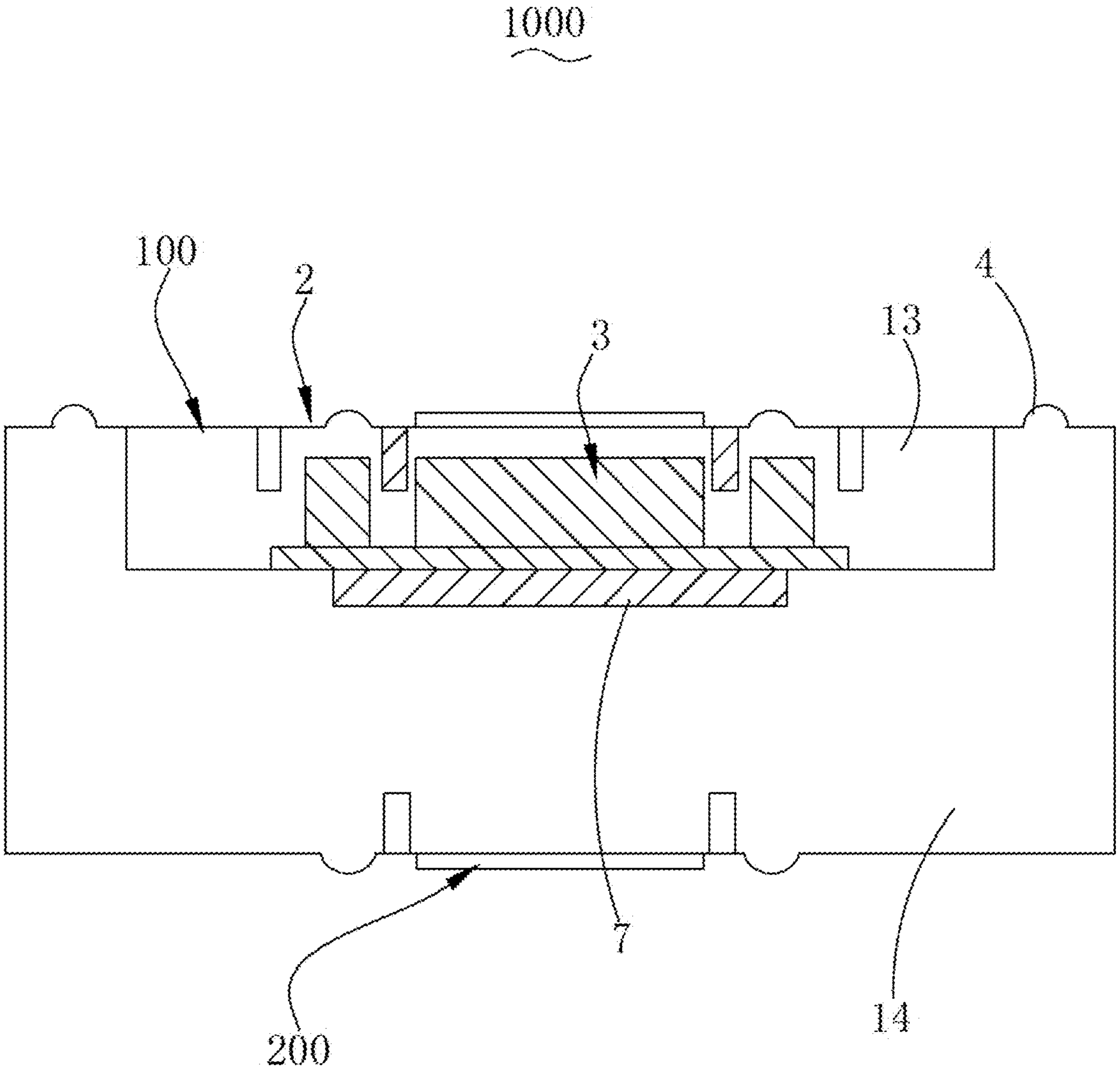
FIG. 13 is a schematic diagram of an internal structure of the electronic device according to a third embodiment of the present invention.
Figure 14:
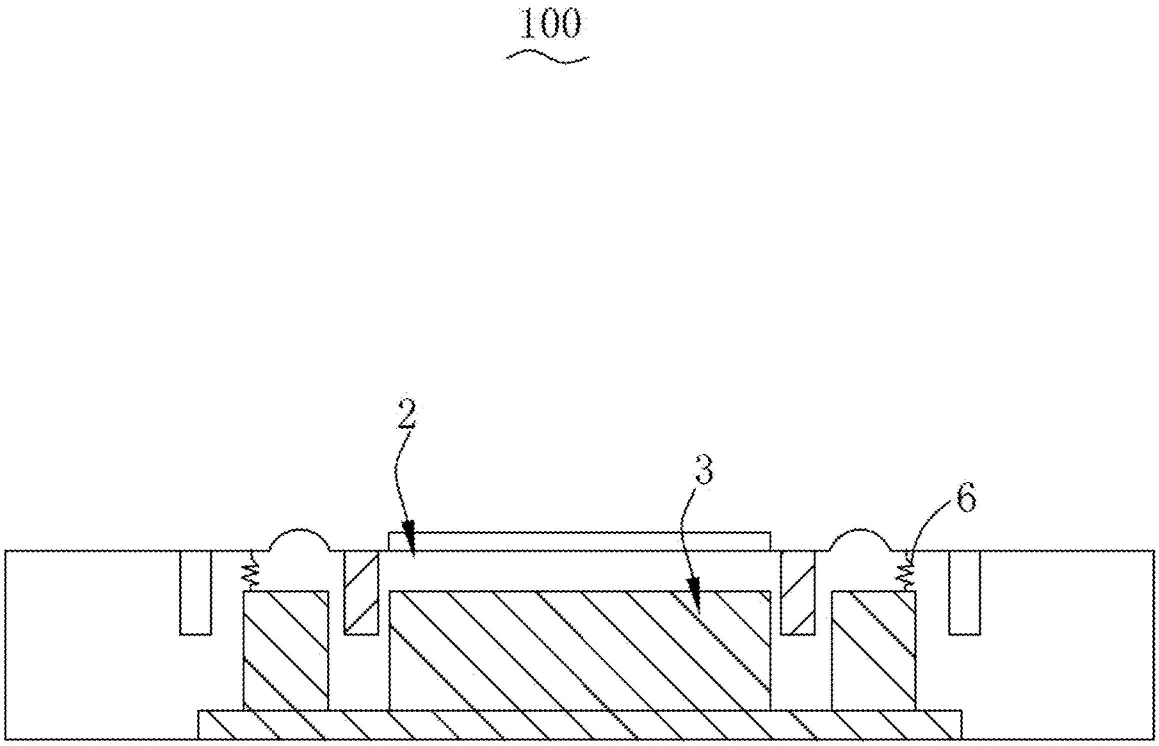
FIG. 14 is a schematic diagram of an internal structure of the first sound-emitting device according to a fourth embodiment of the present invention.

In this embodiment, referring to FIGS. 9-11, if defining the addition of the mass block 7 and the first clastic damping member 5 as the first vibration damping structure, and on the basis of the first vibration damping structure, hollowing out the center of the central magnetic circuit of the first vibration damping structure and adding the structure where the magnet assembly 9 is connected to the dome 214 is defined as the second vibration damping structure. The module SPL and two-in-one device SPL curves (characterizing the sound emission performance) as well as the internal pressure curve of the mobile phone (characterizing the degree of casing vibration) under the conventional structure, the first vibration damping structure, and the second vibration damping structure. In the figure, the debugging parameters are set to achieve the best vibration damping effect near the specified frequency of 200 Hz. Corresponding adjustments can be made according to the actual casing vibration modal frequency of the mobile phone. It can be seen that after adopting the second vibration damping structure, the internal pressure of the mobile phone is further reduced, that is, the casing vibration is further decreased. Meanwhile, the low-frequency sensitivity of the vibration damping module and the two-in-one device is increased.

In this embodiment, the soft-iron assembly 11 includes a first soft-iron layer 111 fixed to one side of the magnetic bowl 33 adjacent to the vibration system 2, a first plastic layer 112 laminated and fixed on the first soft-iron layer 111, and a second soft-iron layer 113 laminated and fixed on the first plastic layer 112. The hollow structure is formed penetrating through the second soft-iron layer 113, the first plastic layer 112 and the first soft-iron layer 111 in sequence.

In this embodiment, the soft-iron assembly 11 further includes a second plastic layer 114, and the second plastic layer 114 is fixed between the first soft-iron layer 111 and the magnetic bowl 33.

In a third embodiment, referring to FIGS. 1-13, the structure of the third embodiment is basically the same as that of the first embodiment or the second embodiment. The difference is that the electronic device 1000 further includes a second clastic damping member 4, and the first sound-emitting device 100 is elastically supported on the casing 300 through the second elastic damping member 4. A suspension system is obtained by hermetically connecting the first sound-emitting device 100 and the mobile phone casing using the second elastic damping member 4. In the internal cavity of the mobile phone, the vibration pressure of this suspension system is out of phase with that of the two-in-one device, which can further reduce the internal cavity pressure of the mobile phone. By rationally designing the mass, stiffness, and damping parameters of the vibration system of the first sound-emitting device and designing the resonant frequency of the entire module according to these parameters, the vibration damping effect at this resonant frequency can be enhanced, thereby satisfying the vibration damping effects of multiple frequency bands on the whole. By combining the magnetic circuit suspension system of the first sound-emitting device, the effect of suppressing casing vibration within multiple frequency ranges can also be achieved.

Furthermore, in the first embodiment or the second embodiment the first sound-emitting device is connected to the mobile phone by the second elastic damping member 4. The connection area is sealed, and the size of the connection area can be adjusted to change the radiation area of the entire module suspension system inside the mobile phone. The first sound-emitting device can also add the mass block 7, by adjusting the mass of the mass block 7 and the stiffness and damping of the second clastic damping member 4, the corresponding resonant frequency and damping of the suspension system of the first sound-emitting device can be set, so as to achieve the best vibration isolation effect at the selected casing vibration modal frequency, thereby realizing the vibration damping effect in multiple frequency bands.

In a fourth embodiment, referring to FIGS. 1-14, the structure of the fourth embodiment is basically the same as that of the first embodiment. The difference is that the first sound-emitting device 100 further includes a third clastic damping member 6. The third elastic damping member 6 connects to the basket 1 and the auxiliary magnetic 32.

Specifically, by connecting the auxiliary magnetic 32 through the third elastic damping member 6, it is convenient for assembly positioning, and at the same time, it can share part of the stiffness and damping of the suspended magnetic circuit system 3.

In this embodiment, the second elastic damping member 4 and the third elastic damping member 6 are made of the same material as the first elastic damping member 5.

Compared with the related art, in the electronic device of the present invention, the first sound-emitting device and the second sound-emitting device are fixed to the casing and spaced apart from each other. Among them, the first sound-emitting device further includes an upper shell fixed on the side of the basket adjacent to the vibration system. The upper shell and the diaphragm are arranged to enclose the front cavity for sound output. The first sound-emitting device further includes the first elastic damping member. The first elastic damping member is connected to the magnetic bowl and the basket for supporting vibration of the magnetic circuit system. The diaphragm, the magnetic bowl, the basket and the first elastic damping member are hermetically arranged to enclose and form the first rear cavity. The first sound-emitting device, the second sound-emitting device and the casing are enclosed to form a second rear cavity. The vibrations of the magnetic circuit system and the vibration system jointly form two suspension systems. Subject to the interaction forces with opposite directions, the force exerted on a speaker when it is connected to a terminal device is reduced, achieving a certain vibration-damping effect and thus avoiding the problem of casing vibration. In addition, when the first sound-emitting device and the second sound-emitting device are emitting sound, inside the electronic device, the first sound-emitting device and the second sound-emitting device are out of phase in terms of the internal pressure of the mobile phone. This can significantly reduce the pressure inside the cavity of the electronic device within the frequency band where casing vibration is more pronounced, further achieving the effect of reducing casing vibration. Meanwhile, the above structural arrangement of the first sound-emitting device can increase the low-frequency sensitivity of the second sound-emitting device, further enhancing the acoustic performance of the sound-emitting devices.

It should be noted that those of ordinary skill in the art can further make improvements without departing from the concept of the present invention. These improvements shall all fall within the protection scope of the present invention.

What is claimed is:

1. An electronic device comprising:

a casing;

a first sound-emitting device; and a second sound-emitting device, wherein the first sound-emitting device and the second sound-emitting device are accommodated in the casing, fixed to the casing and spaced apart from each other; the first sound-emitting device comprises a basket, a vibration system fixed to the basket and a magnetic circuit system driving the vibration system to vibrate; the vibration system comprises a diaphragm fixed to the basket and a voice coil driving the diaphragm to vibrate for emitting sound; the magnetic circuit system comprises a magnetic bowl fixed to the basket, a magnetic unit fixed to one side of the magnetic bowl adjacent to the vibration system and an auxiliary magnetic spaced apart from the magnetic unit, and a magnetic gap is formed between the magnetic unit and the auxiliary magnetic; the voice coil is inserted into the magnetic gap;

wherein the first sound-emitting device further comprises an upper shell fixed to one side of the basket adjacent to the vibration system, and a front cavity for sound output formed by the upper shell and the diaphragm enclosing each other; the first sound-emitting device further comprises a first elastic damping member, the first elastic damping member is connected to the magnetic bowl and the basket for supporting vibration of the magnetic circuit system, the diaphragm, the magnetic bowl, the basket and the first elastic damping member are sealed and enclosed to form a first rear cavity, and the first sound-emitting device, the second sound-emitting device and the casing are enclosed to form a second rear cavity.

2. The electronic device according to claim 1, wherein the first elastic damping member comprises a ring-shaped first fixing portion fixed to one side of the basket away from the vibration system, an elastic portion formed by bending and extending from one side of the first fixing portion adjacent to the magnetic unit and a second fixing portion formed by extending from one side of the elastic portion adjacent to the magnetic unit, and the second fixing portion is fixed to an outer periphery of the magnetic bowl.

3. The electronic device according to claim 2, wherein a cross-section of the elastic portion along a vibration direction of the vibration system is of an S-shaped, W-shaped or C-shaped structure.

4. The electronic device according to claim 1, wherein the first elastic damping member is made of a single-element damping material, a polymeric damping material, or a metal composite damping structural material.

5. The electronic device according to claim 1, wherein the first sound-emitting device further comprises a mass block fixed to one side of the magnetic bowl away from the vibration system.

6. The electronic device according to claim 1, wherein the magnetic unit is provided with a through hole formed to penetrate along the vibration direction of the vibration system;

the first sound-emitting device further comprises a non-magnetic connecting member fixed to one side of the diaphragm adjacent to the magnetic circuit system and a magnet assembly fixed to one side of the non-magnetic connecting member adjacent to the magnetic circuit system, and the non-magnetic connecting member and the magnet assembly are suspended inside the through hole respectively.

7. The electronic device according to claim 6, wherein the first sound-emitting device further comprises a soft-iron assembly with a hollow structure positioned inside the through hole and fixed to the magnetic bowl, and the magnet assembly is suspended in the hollow structure and spaced apart from the soft-iron assembly.

8. The electronic device according to claim 7, wherein the soft-iron assembly comprises a first soft-iron layer fixed to one side of the magnetic bowl adjacent to the vibration system, a first plastic layer laminated and fixed on the first soft-iron layer, and a second soft-iron layer laminated and fixed on the first plastic layer.

9. The electronic device according to claim 8, wherein the soft-iron assembly further comprises a second plastic layer, and the second plastic layer is fixed between the first soft-iron layer and the magnetic bowl.

10. The electronic device according to claim 1, wherein the electronic device further comprises a second elastic damping member, and the first sound-emitting device is elastically supported on the casing through the second elastic damping member.

11. The electronic device according to claim 1, wherein the first sound-emitting device further comprises a third elastic damping member, and the third elastic damping member connects to the basket and the auxiliary magnetic.

* * * * *